United States Patent [19]
Roth

[11] 3,939,070
[45] Feb. 17, 1976

[54] METHOD AND INSTALLATION FOR THE TREATMENT OF WASTE WATER TO FORM USEFUL WATER

[75] Inventor: Hanspeter Roth, Effretikon, Switzerland

[73] Assignee: "Swissair" Schweizerische Luftverkehr-AG, Zurich, Switzerland

[22] Filed: July 10, 1974

[21] Appl. No.: 486,949

[30] Foreign Application Priority Data
July 13, 1973 Switzerland...................... 10289/73

[52] U.S. Cl............................... 210/23 H; 210/259
[51] Int. Cl.²................... B01D 31/00; B01D 13/00
[58] Field of Search ....... 210/44, 23, 258, 259, 321, 210/494

[56] References Cited
UNITED STATES PATENTS

| | | | |
|---|---|---|---|
| 3,386,583 | 6/1968 | Merten | 210/494 X |
| 3,542,203 | 11/1970 | Hancock et al. | 210/494 X |
| 3,839,206 | 10/1974 | Welch | 210/259 |

OTHER PUBLICATIONS

Gouveia et al., "Potable Water from Hospital Wastes by Reverse Osmosis," from Chem. Eng. Progress, Vol. 64, No. 90, 1968, pp. 280–284 relied on.

*Primary Examiner*—Frank A. Spear, Jr.
*Attorney, Agent, or Firm*—Gordon W. Hueschen

[57] ABSTRACT

A method for the treatment of waste water to form useful water, comprising the steps of subjecting the waste water to a chemical flocculation treatment, floating the formed turbid portion of the waste water, and subjecting the clarified water to reverse osmosis filtration.

The waste water treatment plant or installation for the performance of the aforesaid method comprises, in combination, apparatus for carrying out the chemical flocculation treatment, an electro flotation installation, and a reverse osmosis installation.

5 Claims, 1 Drawing Figure

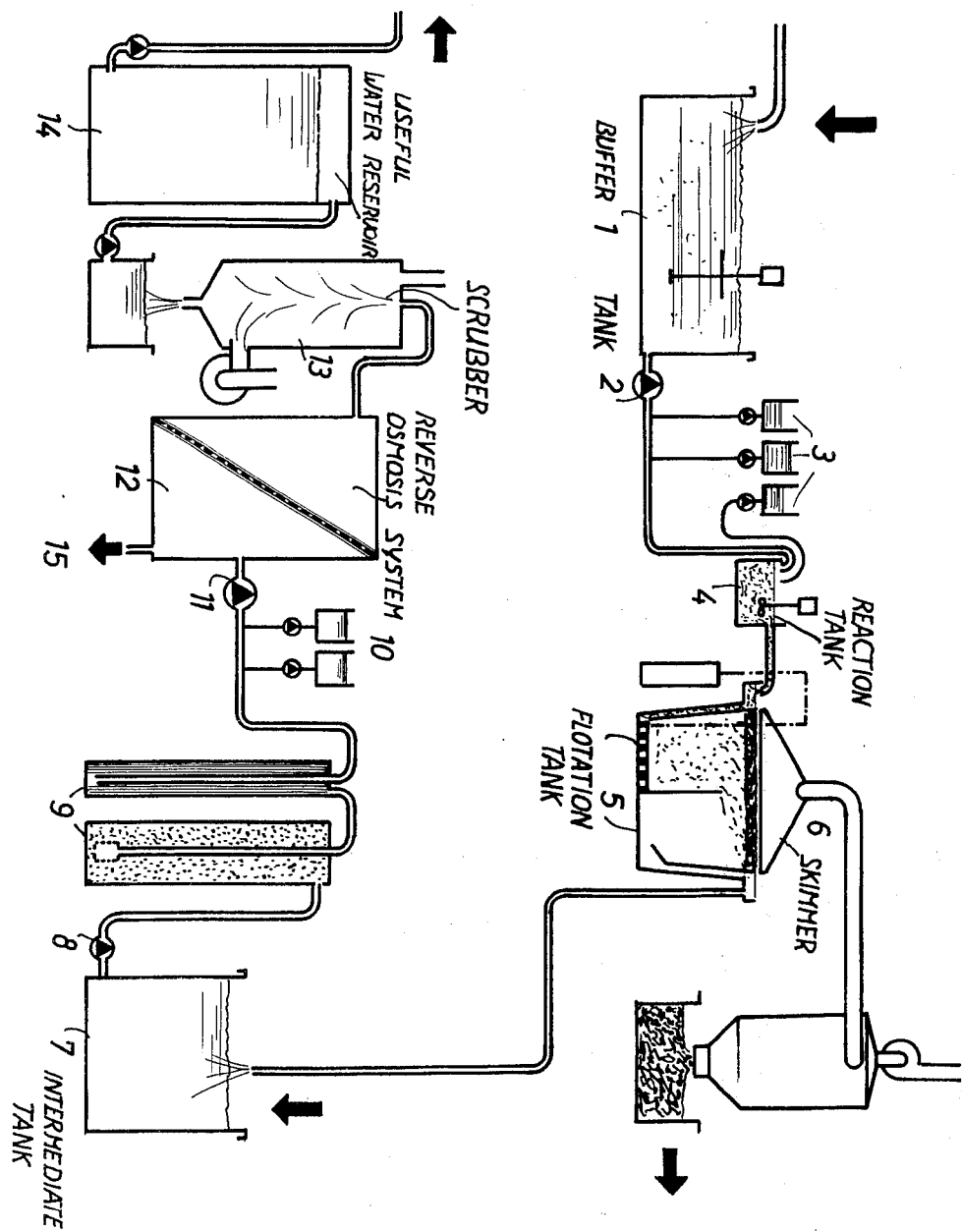

METHOD AND INSTALLATION FOR THE TREATMENT OF WASTE WATER TO FORM USEFUL WATER

BACKGROUND OF THE INVENTION

The present invention relates to a new and improved method of, and installation or plant, for the treatment or preparation of waste water so as to form circulating water, also hereinafter referred to as useful or consumable water.

The waste water which is produced in industrial operations, depending upon the nature of the contaminants, quantity and flow or transport of the substances, is so multifarious that in order to satisfy the requirements concerning protection of the environment it is extremely difficult to treat in an economically feasible manner the accumulated waste water so as to form useful or consumable water. The treatment is associated with exceptional difficulties if the waste water contains, apart from the dissolved substances, also sludge and/or emulsified constituents, for instance emulsions formed from washing processes.

SUMMARY OF THE INVENTION

It is a primary object of the present invention to provide a new and improved method of treating waste water permitting of an economically feasible treatment of the waste water which is accumulated due to industrial operations or the like, especially for the treatment of waste water which in particular also contains sludge and emulsified constituents, so as to form useful or consumable water (circulation water).

Another object of the present invention aims at the provision of a plant for the treatment of waste water so as to form useful or consumable water in a highly efficient and economical manner.

Now in order to implement these and still further objects of the invention, which will become more readily apparent as the description proceeds, the method aspects of the invention are manifested by the features that the waste water a. is subjected to a chemical flocculation treatment;

b. the accumulated turbid portion of the waste water is floated by electro-flotation; and c. the clarified water is subjected to a reverse osmosis filtration.

Due to the chemical flocculation treatment followed by electro-flotation there is achieved a pre-purification or pre-clarification of the waste water, rendering possible a further purification of the clarified water by a reverse osmosis filtration. The combination of the aforementioned method steps (a), (b) and (c) renders possible the economical treatment of organic, inorganic and mixture-loaded waste water into useful water.

The flocculation treatment is carried out generally in conventional manner in that there is added to the buffered waste water a flocculation agent or flocculant, preferably metallic salts, such as iron chloride, iron sulfate or aluminum sulfate, which throughout certain pH-ranges form flaky or flocculent precipitants and, if desired, there can be added flocculants.

The separation of the suspended substances or particles can occur in conventional manner by electro-flotation, if necessary with the aid of collectors or accumulators and foamers. There is thus employed electro-flotation wherein the gas bubbles are produced at the turbid portions of the waste water by electrolysis, for instance as disclosed in Swiss Pat. No. 425,655, to which reference may be readily had and the disclosure of which is incorporated herein by reference.

The clarified water from the flotation process is preferably delivered through the agency of a safety filter directly to the reverse osmosis filtration. It is preferable that the clarified water which is further purified by reverse osmosis, be purified through the use of wound cellulose acetate modules arranged in pressure pipes or tubes.

BRIEF DESCRIPTION OF THE DRAWING

The invention will be better understood, and objects other than those set forth above will become apparent, when consideration is given to the following detailed description thereof. Such description makes reference to the annexed drawing wherein the single FIGURE schematically illustrates a preferred construction of plant or installation for the performance of the method aspects of this development.

DETAILED DESCRIPTION OF THE PREFERRED EMBODIMENTS

Referring now to the drawing the accumulated waste water is buffered in the buffer tank 1 and is fed along in the system by feed or conveying pump 2. For the separation of the emulsions flocculation chemicals are added at the dosing arrangement 3 and in the reaction vessel or tank 4 there is carried out a complete flocculation for a defined residence time. In the flotation tank or vat 5 the flakes or flocculate are separated from the aqueous phase by means of electrolytically produced fine gas bubbles serving as the flotation agent. The floated sludge is periodically removed by means of a skimmer 6. The clarified and de-sludged waste water flows out of the flotation vat or tank 5 via a partition or separation wall system ans flows into the intermediate tank or vessel 7. The pre-pressure pump 8 supplies the reverse osmosis system 12 through the agency of the safety filter system 9 consisting of the compressed sand filter and fine filter and the high-pressure pump 11. In order to protect the module membranes of the reverse osmosis system there are added at the infeed device 10 small quantities of chemicals (pH-correction, disinfectants). The purified water flowing out of the reverse osmosis system 12 is degasified in a scrubber 13 and delivered into the useful water reservoir or network 14. The flow of concentrate, schematically indicated by reference character 15, is delivered into a not particularly illustrated pre-flooder.

While there is shown and described present preferred embodiments of the invention, it is to be distinctly understood that the invention is not limited thereto but may be otherwise variously embodied and practiced within the scope of the following claims.

Accordingly, what is claimed is:

1. A method for the treatment of industrial waste water for forming useful water, comprising the steps of:

a. subjecting the waste water to a chemical flocculation treatment;

b. floating the flocculate and turbid portions of the waste water which are formed during the flocculation treatment by electro-flotation; and c. subjecting the clarified water to filtration by reverse osmosis.

2. The method as defined in claim 1, wherein the reverse osmosis employs a cellulose acetate membrane filter.

3. The method as defined in claim 2, wherein the membrane filter is a wound module arranged in a pressure tube.

4. A water purification plant for the treatment of industrial waste water to form useful water, comprising, in combination:

apparatus for subjecting the waste water to a chemical flocculation treatment, a flotation installation operatively connected with the flocculation-treatment apparatus including an electro-flotation cell for floating the flocculate and turbid portions of the waste water, and a reverse osmosis filtration installation operatively connected with the flotation installation.

5. The waste water purification plant as defined in claim 4, wherein said reverse osmosis means incorporates modules containing wound cellulose acetate membranes arranged in pressure tubes.

* * * * *